US009377114B2

(12) United States Patent  (10) Patent No.: US 9,377,114 B2
Reifenberger  (45) Date of Patent:  Jun. 28, 2016

(54) PRESSURE CONTROL VALVE FOR REACTIVE ADHESIVES

(71) Applicant: Nordson Corporation, Westlake, OH (US)

(72) Inventor: Mark G. Reifenberger, Norcross, GA (US)

(73) Assignee: NORDSON CORPORATION, Westlake, OH (US)

( * ) Notice: Subject to any disclaimer, the term of this patent is extended or adjusted under 35 U.S.C. 154(b) by 177 days.

(21) Appl. No.: 13/776,838

(22) Filed: Feb. 26, 2013

(65) Prior Publication Data

US 2013/0284285 A1  Oct. 31, 2013

Related U.S. Application Data

(60) Provisional application No. 61/637,981, filed on Apr. 25, 2012.

(51) Int. Cl.
*F16K 41/12* (2006.01)
*F16K 15/06* (2006.01)
(Continued)

(52) U.S. Cl.
CPC ............. *F16K 15/00* (2013.01); *B05C 11/1013* (2013.01); *F16K 15/063* (2013.01); *F16K 41/12* (2013.01); *Y10T 137/6416* (2015.04); *Y10T 137/86019* (2015.04)

(58) Field of Classification Search
CPC ....... F16K 15/00; F16K 15/063; F16K 41/12; F16K 41/10; F16K 17/0453; F16K 17/085; B05C 11/1013; Y10T 137/6416; Y10T 137/86019; Y10T 137/7738; Y10T 137/774

USPC .......... 137/536, 540, 565.13, 563; 251/335.3, 251/335.2, 335.1; 417/311, 307, 440
See application file for complete search history.

(56) References Cited

U.S. PATENT DOCUMENTS 657,891 A * 9/1900 Donnelly .............. F16K 17/085
137/510
937,597 A * 10/1909 Grussendorf ................. 137/522
(Continued)

FOREIGN PATENT DOCUMENTS

CH  179551 A  9/1935
DE  1036575 B  8/1958
(Continued)

OTHER PUBLICATIONS

EFD, Piston Valves Systems for Precise Deposits of Viscous Fluids, Brochure, 2006, 2 pgs.
(Continued)

*Primary Examiner* — Craig Schneider
*Assistant Examiner* — David Colon Morales
(74) *Attorney, Agent, or Firm* — Baker & Hostetler LLP (57) ABSTRACT

A pressure control valve for reactive adhesives includes a valve housing with a liquid recirculation passage communicating with a conduit leading to a dispensing apparatus and an adhesive pump, a valve element mounted within the valve housing, and a biasing member for biasing the valve element towards a valve seat in the liquid passage. The pressure control valve also includes a flexible seal with a first end fixedly coupled to the valve element and a second end fixedly coupled to the valve housing. The flexible seal also includes an intermediate portion that flexes or deforms as the first end of the flexible seal follows movements of the valve element, thereby preventing liquid adhesive in the liquid recirculation passage from contacting the biasing member. The flexible seal may include an arch-shaped compression seal or a thin flexible annular membrane.

7 Claims, 7 Drawing Sheets

(51) Int. Cl.
  *B05C 11/10* (2006.01)
  *F16K 15/00* (2006.01)

(56) References Cited

U.S. PATENT DOCUMENTS

| | | | | |
|---|---|---|---|---|
| 1,653,492 A * | 12/1927 | Cadwell | | E03D 3/06 251/209 |
| 1,876,938 A * | 9/1932 | Horne | | 137/73 |
| 1,996,309 A * | 4/1935 | Simpson | | 251/268 |
| 2,011,333 A * | 8/1935 | Clifton | | 137/538 |
| 2,054,772 A * | 9/1936 | Light et al. | | 251/149.5 |
| 2,099,643 A * | 11/1937 | Werring | | G05D 23/025 137/536 |
| 2,162,898 A * | 6/1939 | Rotter | | 137/512.1 |
| 2,239,169 A * | 4/1941 | Franck | | 137/536 |
| 2,264,656 A * | 12/1941 | Briscoe et al. | | 137/536 |
| 2,272,318 A * | 2/1942 | Dennis | | 137/510 |
| 2,286,713 A * | 6/1942 | Burks | | F16K 17/06 137/469 |
| 2,351,190 A * | 6/1944 | Carlson | | 236/92 C |
| 2,400,861 A * | 5/1946 | Wolcott | | 137/536 |
| 2,448,429 A * | 8/1948 | Henry | | 137/68.28 |
| 2,539,088 A * | 1/1951 | Leach | | B60R 25/042 137/354 |
| 2,575,775 A * | 11/1951 | Teeters | | F16K 41/12 251/278 |
| 2,585,575 A * | 2/1952 | Nedergaard | | F16K 17/044 137/471 |
| 2,590,656 A * | 3/1952 | Schnebel | | 137/536 |
| 2,603,231 A * | 7/1952 | Birkemeier | | 137/218 |
| 2,638,309 A * | 5/1953 | Fortune | | F16K 41/12 251/272 |
| 2,679,860 A * | 6/1954 | Diebold | | G01L 7/00 137/535 |
| 2,704,548 A * | 3/1955 | Ralston | | 137/469 |
| 2,839,076 A * | 6/1958 | Mueller | | 137/469 |
| 2,871,877 A * | 2/1959 | Work | | F16K 17/085 137/179 |
| 2,876,794 A * | 3/1959 | Reedy | | 137/517 |
| 2,888,946 A * | 6/1959 | Barron | | F16K 17/085 137/469 |
| 3,146,720 A * | 9/1964 | Henry | | 417/310 |
| 3,211,416 A | 10/1965 | Billeter et al. | | |
| 3,399,695 A * | 9/1968 | Stehlin | | 137/551 |
| 3,744,751 A * | 7/1973 | Robinson | | 251/276 |
| 3,759,425 A | 9/1973 | Lee | | |
| 3,775,030 A * | 11/1973 | Wanner | | F04B 1/14 417/388 |
| 3,782,410 A * | 1/1974 | Steuby | | F16K 17/085 137/496 |
| 3,982,724 A | 9/1976 | Citrin | | |
| 4,066,188 A | 1/1978 | Scholl et al. | | |
| 4,126,321 A | 11/1978 | Harjar et al. | | |
| 4,200,207 A * | 4/1980 | Akers et al. | | 222/190 |
| 4,245,667 A * | 1/1981 | Braukmann | | 137/493 |
| 4,359,204 A * | 11/1982 | Williams | | 251/331 |
| 4,535,919 A * | 8/1985 | Jameson | | 222/190 |
| 4,543,988 A * | 10/1985 | Huveteau | | 137/542 |
| 4,583,662 A | 4/1986 | Silverthorn et al. | | |
| 4,651,906 A | 3/1987 | Hoffmann et al. | | |
| 4,712,576 A | 12/1987 | Ariizumi et al. | | |
| 4,726,395 A * | 2/1988 | Howes et al. | | 137/469 |
| 4,890,639 A * | 1/1990 | Loliger | | F16K 17/0453 137/241 |
| 4,941,504 A * | 7/1990 | Beauvir | | 137/524 |
| 5,074,468 A * | 12/1991 | Yamamoto et al. | | 239/69 |
| 5,114,055 A | 5/1992 | Worth | | |
| 5,152,500 A | 10/1992 | Hoobyar et al. | | |
| 5,244,152 A | 9/1993 | Hofmann | | |
| 5,292,068 A | 3/1994 | Raterman et al. | | |
| 5,447,254 A | 9/1995 | Hoover et al. | | |
| 5,535,919 A | 7/1996 | Ganzer et al. | | |
| 5,598,974 A | 2/1997 | Lewis et al. | | |
| 5,623,962 A * | 4/1997 | Danzy et al. | | 137/469 |
| 5,630,444 A | 5/1997 | Callaghan et al. | | |
| 5,645,224 A | 7/1997 | Koch | | |
| 5,678,803 A * | 10/1997 | Shinohara et al. | | 251/368 |
| 5,794,825 A | 8/1998 | Gordon et al. | | |
| 5,853,124 A | 12/1998 | Beck et al. | | |
| 5,865,423 A * | 2/1999 | Barber | | F16K 41/12 251/335.1 |
| 5,899,385 A | 5/1999 | Hofmann et al. | | |
| 5,941,505 A * | 8/1999 | Nagel | | F16K 41/12 137/312 |
| 5,957,343 A | 9/1999 | Cavallaro | | |
| 6,056,155 A | 5/2000 | Byerly et al. | | |
| 6,102,071 A * | 8/2000 | Walton et al. | | 137/540 |
| 6,173,736 B1 * | 1/2001 | Ligh | | F16K 17/085 137/494 |
| 6,253,957 B1 | 7/2001 | Messerly et al. | | |
| 6,334,554 B1 | 1/2002 | Bolyard, Jr. et al. | | |
| 6,343,721 B1 * | 2/2002 | Breault | | 222/399 |
| 6,543,476 B2 * | 4/2003 | Kazaoka | | 137/538 |
| 6,648,006 B1 | 11/2003 | Ostergaard | | |
| 6,712,366 B1 | 3/2004 | Cargill | | |
| 6,799,702 B1 | 10/2004 | Mercer et al. | | |
| 7,070,066 B2 * | 7/2006 | Strong | | B05B 1/306 222/287 |
| 7,156,267 B2 | 1/2007 | Zanga | | |
| 7,617,955 B2 | 11/2009 | Riney | | 222/190 |
| 7,677,414 B2 * | 3/2010 | Hidaka et al. | | 222/190 |
| 2005/0006617 A1 * | 1/2005 | Leys | | F16K 7/17 251/335.2 |
| 2005/0224513 A1 | 10/2005 | Strong et al. | | |
| 2005/0236438 A1 | 10/2005 | Chastine et al. | | |
| 2005/0258390 A1 * | 11/2005 | Stier | | F16K 41/12 251/335.2 |
| 2006/0097015 A1 | 5/2006 | Riney | | |
| 2006/0108383 A1 | 5/2006 | Byerly | | |
| 2006/0124672 A1 | 6/2006 | Penalver Garcia | | |
| 2006/0273206 A1 * | 12/2006 | Schulz | | F16K 41/103 239/533.1 |
| 2008/0061080 A1 * | 3/2008 | Riney | | 222/146.2 |
| 2009/0242041 A1 * | 10/2009 | Matsuda | | F25B 41/062 137/469 |
| 2010/0096578 A1 * | 4/2010 | Franz | | F16K 41/12 251/318 |
| 2011/0079618 A1 | 4/2011 | Chastine et al. | | |

FOREIGN PATENT DOCUMENTS

| | | |
|---|---|---|
| DE | 1960566 | 5/1967 |
| DE | 3153338 C2 | 6/1989 |
| DE | 3812384 A1 | 10/1989 |
| DE | 4122594 A1 | 11/1992 |
| DE | 10046326 A1 | 4/2002 |
| DE | 20202381 U1 | 7/2002 |
| DE | 202008017338 U1 | 5/2009 |
| EP | 0400846 A2 | 12/1990 |
| EP | 1046809 A2 | 10/2000 |

OTHER PUBLICATIONS

EFD, Compact Diaphragm Valve for Fine Flow Control, Brochure, 2006, 2 pgs.

* cited by examiner

PRESSURE CONTROL VALVE FOR REACTIVE ADHESIVES

CROSS-REFERENCE TO RELATED APPLICATION

This application claims the priority of U.S. Provisional Patent Application Ser. No. 61/637,981, filed on Apr. 25, 2012 (pending), the disclosure of which is incorporated by reference herein.

FIELD OF THE INVENTION

The present invention generally relates to an adhesive supply component configured to supply pressurized adhesive to an adhesive dispensing apparatus and more particularly, to a pressure control valve for the adhesive supply component.

BACKGROUND

In adhesive dispensing systems, a dispensing apparatus such as a dispensing module is generally fed liquid adhesive material from an adhesive melter or another similar adhesive supply component. The adhesive supply component may include a pressure control valve for regulating the flow and pressure of liquid adhesive delivered to the dispensing module. In these pressure control valves, a biasing member such as a coil spring biases a valve element towards a closed position, while the pressure of the liquid adhesive applies a force to move the valve element away from the closed position. During operation, the valve element continuously attempts to achieve an equilibrium state in which the forces applied on the valve element by the pressurized liquid adhesive and by the biasing member equal one another.

Figure 1:
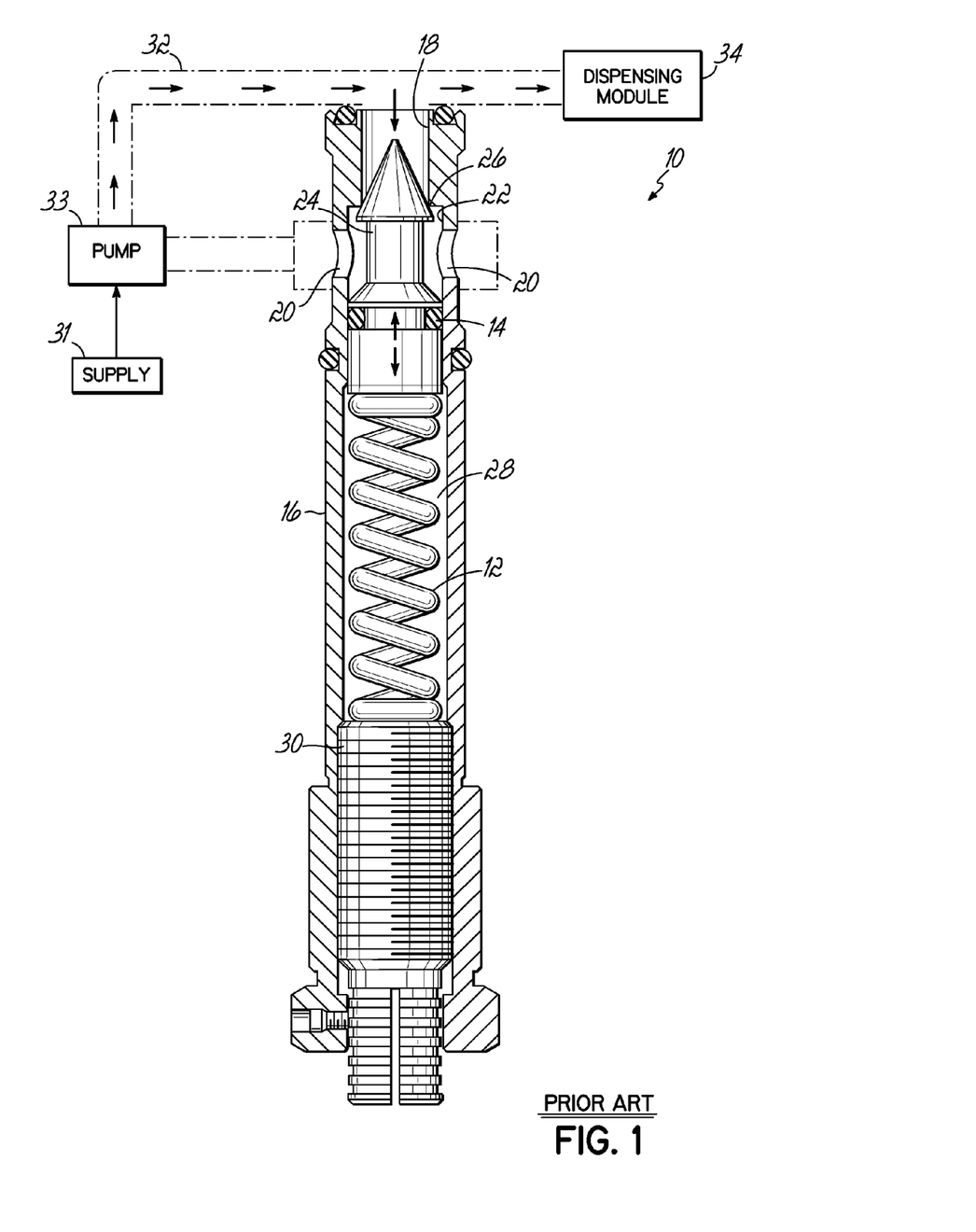
FIG. 1 is a side cross sectional view of a conventional pressure control valve with a dry spring and a dynamic seal.

One example of a conventional pressure control valve 10 is shown in FIG. 1. This pressure control valve 10 includes a dry spring 12 (e.g., a spring 12 that is isolated from the liquid adhesive) and a dynamic seal 14. More particularly, the pressure control valve 10 includes a valve housing 16 including a liquid inlet 18, a liquid outlet 20, and a liquid passage 22 extending from the liquid inlet 18 to the liquid outlet 20. A valve member 24 is located within the liquid passage 22 and moves towards and away from a closed position against a valve seat 26 in the valve housing 16. The dynamic seal 14 is positioned around the valve member 24 so as to divide a dry spring chamber 28 containing the spring 12 from the liquid passage 22. The spring 12 extends between the valve member 24 and an adjustable stop member 30 secured within the valve housing 16.

As pressurized adhesive from an adhesive supply 31 is pumped through a conduit 32 by a pump 33, at least a portion of the adhesive is bled from the conduit 32 downstream of the pump 33 and upstream of a dispensing module 34 fed by the conduit 32. This bleed flow of adhesive enters the liquid inlet 18 such that the adhesive forces the valve member 24 away from the valve seat 26 against the bias of the spring 12 to enable flow of the adhesive out of the liquid outlet 20 back to an inlet of the pump 33 for further recirculation through the conduit 32. As a result, the pressure control valve 10 regulates the pressure of adhesive delivered to the dispensing module 34 by varying the amount of flow through the pressure control valve 10 as a function of the pressure in the conduit 32. The dynamic seal 14 moves with the valve member 24 and frictionally slides along the valve housing 16. When using highly reactive adhesive materials such as polyurethane reactive (PUR) adhesives, cured bits of the liquid adhesive collect against the dynamic seal 14 and contribute to more rapid wearing of the dynamic seal 14. As a result, the dynamic seal 14 requires more frequent replacement to keep liquid adhesive from contacting the spring 12.

Figure 2:
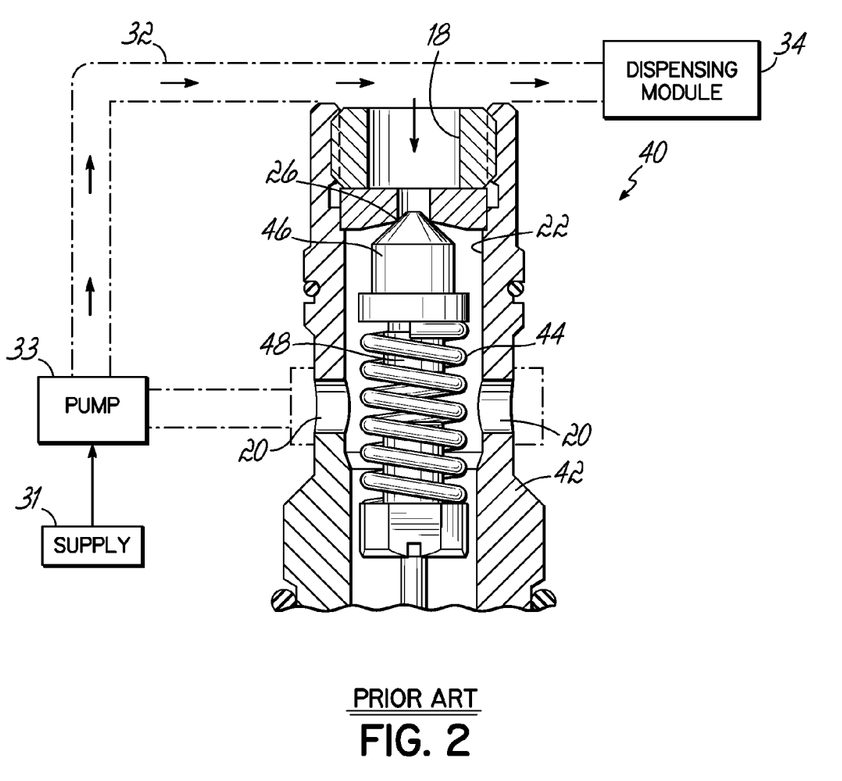
FIG. 2 is a side cross sectional view of another conventional pressure control valve with a flooded spring.
Figure 3:
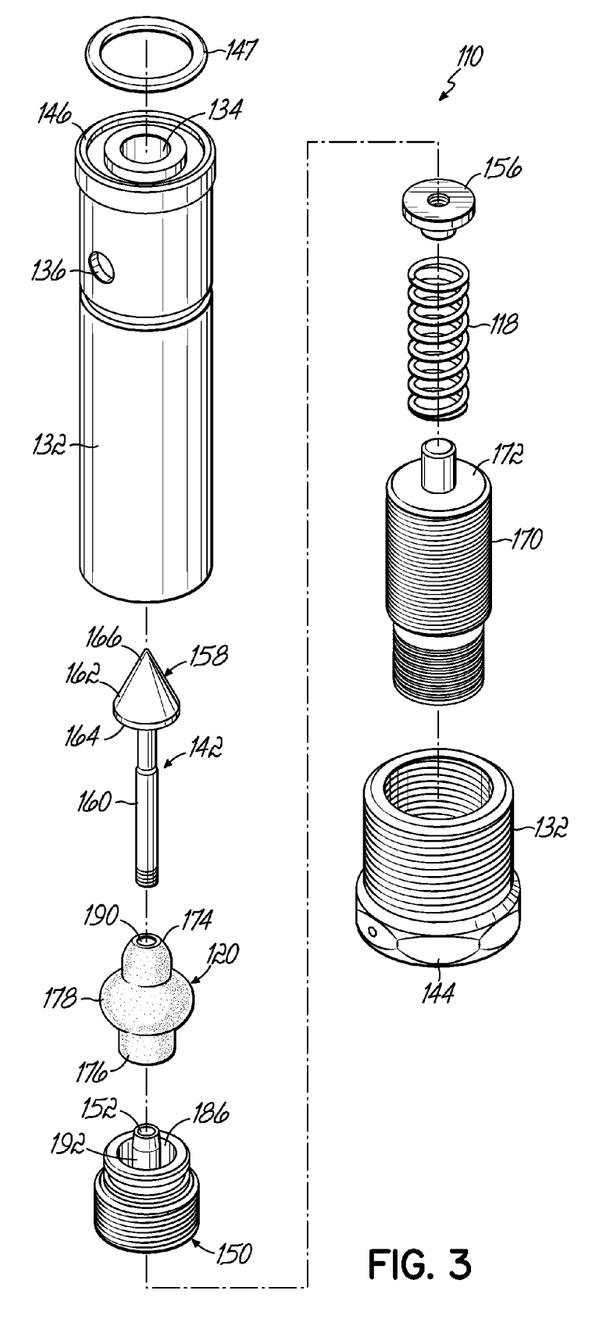
FIG. 3 is a perspective exploded view of one embodiment of a pressure control valve according to the invention.
Figure 4:
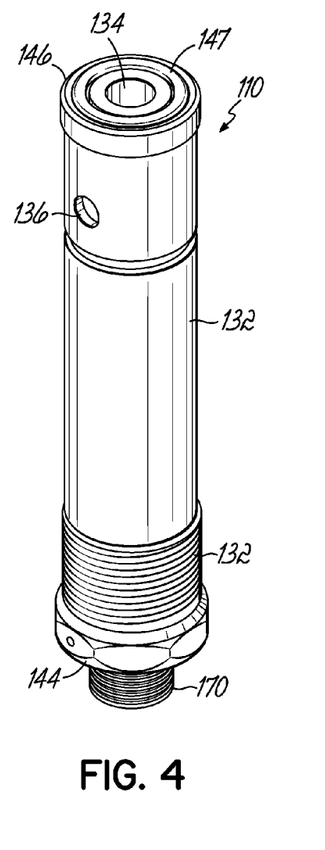
FIG. 4 is a perspective view of the pressure control valve of FIG. 3 in a fully assembled state.

Another example of a conventional pressure control valve 40 is shown in FIG. 2 with the same reference numbers on similar elements from FIG. 1. Similar to the pressure control valve 10 of FIG. 1, this pressure control valve 40 includes a valve housing 42 with a liquid inlet 18 connected to a conduit 32 downstream of a pump 33 and upstream from a dispensing module 34, a liquid outlet 20 leading to an inlet of the pump 33, and a liquid passage 22. However, the pressure control valve 40 of FIG. 2 includes a flooded spring 44 located within the liquid passage 22 for biasing a valve member 46 against a valve seat 26 formed in the valve housing 42. The flooded spring 44 partially surrounds a dead flow area 48 in which minimal flowing movement of the liquid adhesive occurs. Thus, when using highly reactive adhesive materials such as polyurethane reactive (PUR) adhesives, cured bits of the liquid adhesive collect in the dead flow area 48 and slowly cause more sluggish operation of the spring 44. Although this pressure control valve 40 only requires static seals, the flooded spring 44 still requires regular disassembly and cleaning to keep the pressure control valve 40 fully functional.

Consequently, it would be desirable to address these and other concerns associated with conventional pressure control valves.

SUMMARY OF THE INVENTION

In one embodiment of the invention, a pressure control valve is configured to control the pressure of a pressurized adhesive flowing in a conduit from an adhesive pump to a dispensing apparatus. The pressure control valve includes a valve housing with a liquid inlet communicating with the conduit, a liquid outlet communicating with the adhesive pump, and a liquid recirculation passage extending between the liquid inlet and the liquid outlet. The pressure control valve also includes a valve seat formed in the liquid recirculation passage and a valve element mounted within the housing and configured to move with respect to the valve seat to control flow of pressurized adhesive through the valve seat. The valve element includes a pressure surface configured to force the valve element away from the valve seat when pressurized adhesive flows toward the valve element such that the adhesive flowing through the valve seat and the liquid recirculation passage is recirculated to the adhesive pump from the conduit. A biasing member is coupled to the valve element and biases the valve element towards engagement with the valve seat. The pressure control valve also includes a flexible seal including a first end fixedly coupled to the valve element, a second end fixedly coupled to the valve housing, and an intermediate portion that flexes or deforms as the first end follows movements of the valve element. Thus, the flexible seal prevents the pressurized adhesive from contacting the biasing member.

In one aspect, the intermediate portion of the flexible seal extends radially outwardly from the valve element to define an interior cavity between the flexible seal and the valve element. The interior cavity partially expands and contracts as the flexible seal follows movements of the valve element. The intermediate portion is thicker in radial cross section than the first and second ends so as to define an arch shape of the flexible seal.

In another aspect, the valve element includes an annular groove with a transverse surface that abuts the first end of the flexible seal, and the valve housing includes an annular recess with a transverse surface that abuts the second end of the flexible seal. The flexible seal is compressed between the transverse surfaces of the annular groove and the annular recess. The housing further includes a guide insert including the annular recess, a through bore for receiving the valve element, and a housing extension that fixedly engages the second end of the flexible seal. The valve element includes a valve head with a downstream side facing the flexible seal and including the annular groove and an upstream side facing the valve seat and defining at least a portion of the pressure surface.

In yet another aspect, the flexible seal includes a ring-shaped membrane including an inner periphery defining the first end and an outer periphery defining the second end. The intermediate portion extends between the inner and outer peripheries and flexes as the flexible seal follows movements of the valve element. For example, the ring-shaped membrane includes an elastomeric sheet configured to elastically deform in said intermediate portion. The flexible seal divides and fluidically isolates the liquid recirculation passage from a spring chamber containing the biasing member.

In another embodiment, an adhesive supply component supplies a pressurized adhesive to a dispensing apparatus. The adhesive supply component includes an adhesive pump and a supply component housing including a conduit extending between the adhesive pump and a liquid outlet leading to the dispensing apparatus. The supply component housing also includes a liquid recirculation passage extending between the conduit and the adhesive pump. A pressure control valve is coupled to the supply component housing and includes a valve housing defining at least a portion of the liquid recirculation passage. The pressure control valve also includes a valve seat formed in the liquid recirculation passage and a valve element mounted within the housing and configured to move with respect to the valve seat to control flow of pressurized adhesive through the valve seat. The valve element includes a pressure surface configured to force the valve element away from the valve seat when pressurized adhesive flows toward the valve element such that the adhesive flowing through the valve seat and the liquid recirculation passage is recirculated to the adhesive pump from the conduit. A biasing member is coupled to the valve element and biases the valve element towards engagement with the valve seat. The pressure control valve also includes a flexible seal including a first end fixedly coupled to the valve element, a second end fixedly coupled to the valve housing, and an intermediate portion that flexes or deforms as the first end follows movements of the valve element. Thus, the flexible seal prevents the pressurized adhesive from contacting the biasing member.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

With reference to FIGS. 3-5B, one embodiment of a pressure control valve 110 and an adhesive supply component 112 in accordance with the current invention is illustrated. The adhesive supply component 112 is configured to receive liquid adhesive from an adhesive supply 113, pump the liquid adhesive into a conduit 114 with an adhesive pump 115, and deliver that liquid adhesive from the conduit 114 to a dispensing apparatus 116. Although the dispensing apparatus 116 is shown as a dispensing module 116 in the Figures, it will be understood that the dispensing apparatus 116 may include alternative types of dispensing devices including manifolds, guns, etc. in other embodiments of the invention. The pressure control valve 110 operates to regulate the pressure and/or flow of the liquid adhesive flowing in the conduit 114 to the dispensing module 116. Thus, a controlled flow of liquid adhesive such as polyurethane reactive (PUR) adhesive is discharged for dispensing by the dispensing module 116. Advantageously, the pressure control valve 110 includes a biasing member 118 and a flexible seal 120 that keeps the pressurized liquid adhesive isolated from the biasing member 118 while minimizing the need for seal replacement or valve cleaning. To this end, the pressure control valve 110 reduces operational downtime required for maintenance and repair of the adhesive supply component 112.

Figure 5A:
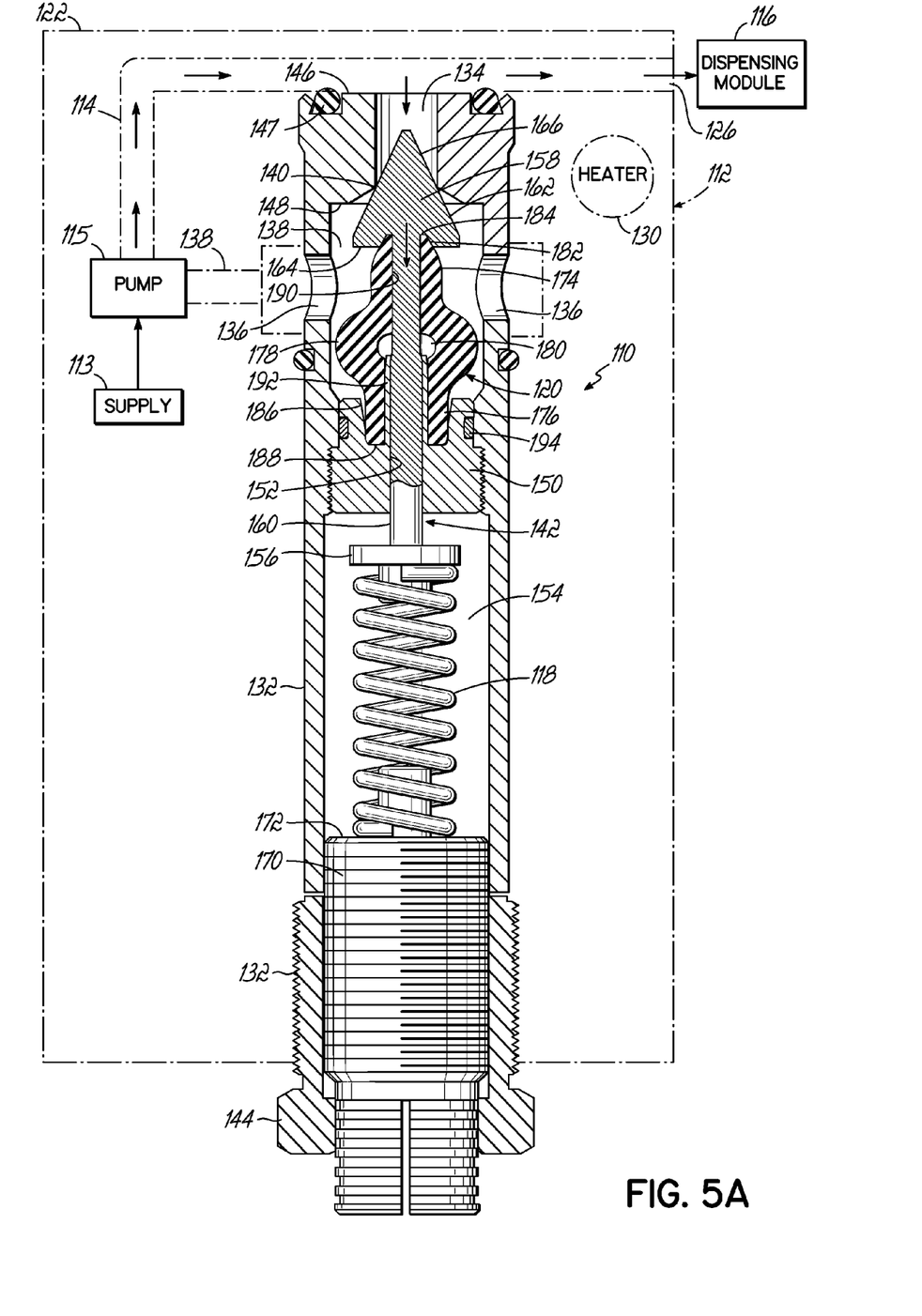
FIG. 5A is a side cross sectional view of an adhesive supply component including the pressure control valve of FIG. 4, with a valve element in a closed position.
Figure 5B:
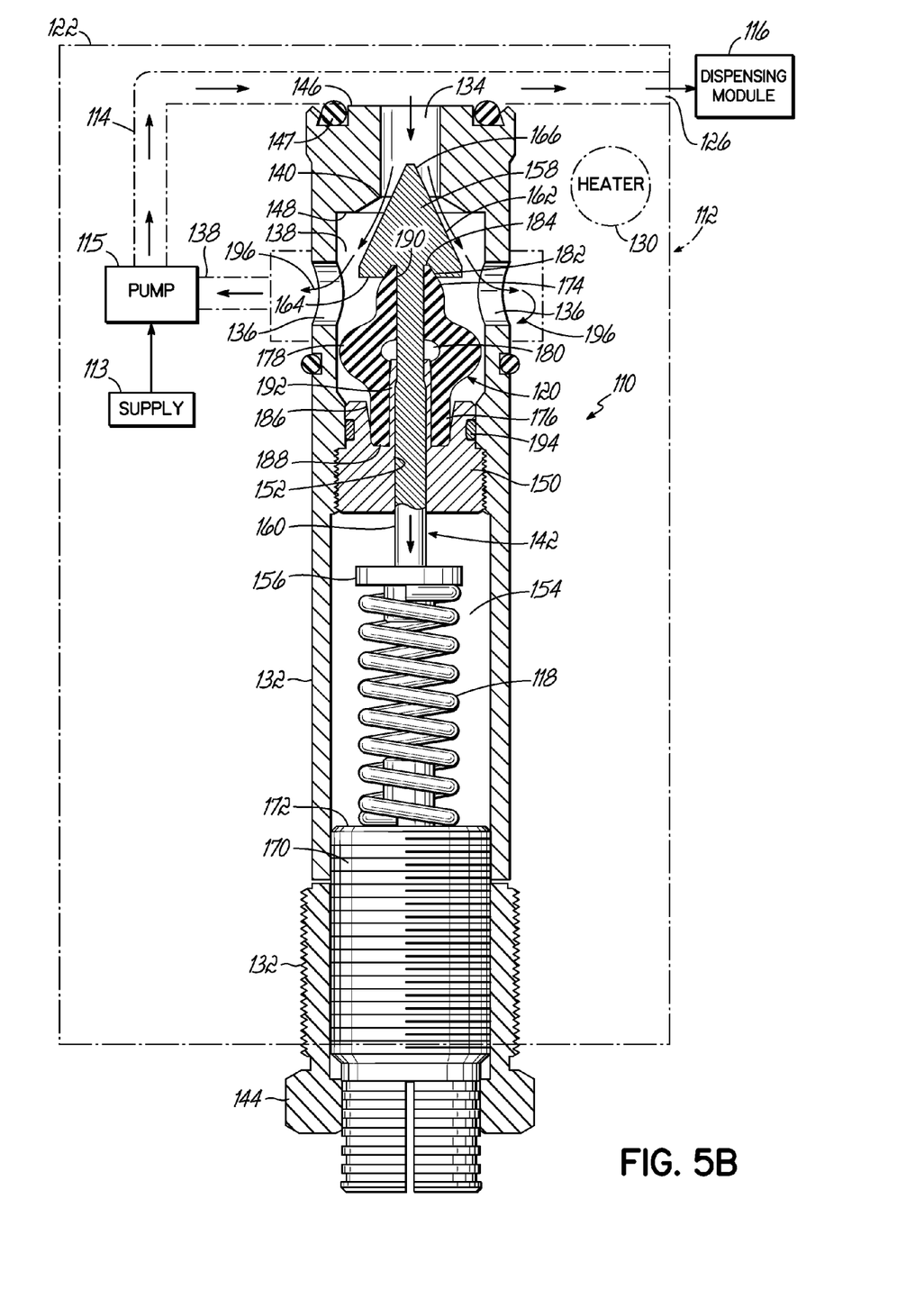
FIG. 5B is a side cross sectional view of the pressure control valve of FIG. 5A, with the valve element in an open position.

As shown in FIGS. 5A and 5B, the adhesive supply component 112 includes the adhesive pump 115 and the conduit 114, which extends between the adhesive pump 115 and a liquid outlet 126 in communication with the dispensing module 116. The liquid adhesive supplied by the adhesive supply component 112 is described herein as a reactive adhesive such as polyurethane reactive (PUR) adhesive, but it will be understood that the adhesive supply component 112 may be used to supply any liquid adhesive or other liquid materials. In the exemplary embodiment with PUR adhesive, the adhesive supply component 112 also includes a heater 130 for maintaining the temperature of the PUR adhesive and thereby limiting the solidification and/or curing of the PUR adhesive within the conduit 114.

The pressure control valve 110 is located substantially within the supply component housing 122. The pressure control valve 110 includes a valve housing 132 with a liquid inlet 134, a liquid outlet 136, and a liquid recirculation passage 138 extending between the liquid inlet 134 and the liquid outlet 136. The liquid recirculation passage 138 of the valve housing 132 also extends through a portion of the supply component housing 122 from the liquid outlet 136 back to the adhesive pump 115 as shown in FIG. 5A. The liquid recirculation passage 138 includes a valve seat 140 located downstream from the liquid inlet 134 and upstream from the liquid outlet 136. The valve seat 140 is configured to interact with a valve element 142 located within the pressure control valve 110 to control the flow of pressurized adhesive through the liquid recirculation passage 138 as described in further detail below.

More particularly, the valve housing 132 defines a generally cylindrical shape having a proximal end 144 located away from the liquid inlet 134 and a distal end 146 at the liquid inlet 134. The distal end 146 includes an O-ring seal 147 for maintaining sealing contact with the conduit 114. The valve housing 132 is arranged with an increased thickness (e.g., the liquid recirculation passage 138 defines a smaller diameter) proximate to the distal end 146 and the liquid inlet 134 and a decreased thickness adjacent the valve element 142. The transition from increased thickness to decreased thickness defines a shoulder 148 in the liquid recirculation passage 138 that forms the valve seat 140. In the illustrated embodiment, the shoulder 148 is chamfered adjacent the valve element 142. However, the shoulder 148 could also define a perpendicular or curved transition from the increased thickness to the decreased thickness in other embodiments within the scope of the invention, as long as the shoulder 148 is arranged to enable annular sealing contact with the valve element 142 when in a closed position.

The valve housing 132 also includes a guide insert 150 including a through bore 152 for receiving the valve element 142. The guide insert 150 effectively divides an interior of the valve housing 132 into the liquid recirculation passage 138 and a spring chamber 154 for holding the biasing member 118. In order to prevent the liquid adhesive from adversely affecting the operation of the biasing member 118, the guide insert 150 and the flexible seal 120 (described in further detail below) fluidically isolate the liquid recirculation passage 138 from the spring chamber 154. Thus, regardless of whether the biasing member 118 is pneumatically and/or manually actuated, the pressurized reactive adhesive will not affect the operation of the biasing member 118 and the valve element 142.

The valve element 142 mounted within the valve housing 132 includes a spring flange 156 located in the spring chamber 154, a valve head 158 located in the liquid recirculation passage 138, and a shaft 160 extending from the spring flange 156 to the valve head 158. In the illustrated embodiment, the valve head 158 defines a substantially arrowhead-like shape with a generally conical upstream side 162 facing the valve seat 140 and a downstream side 164 facing the shaft 160. The upstream side 162 at least partially defines a pressure surface 166 upon which the pressurized adhesive applies force to move the valve element 142 away from the valve seat 140. The shaft 160 extends through the through bore 152 of the guide insert 150 and is coupled to the spring flange 156 by threaded engagement as most clearly shown in FIG. 3. The valve element 142 is moveable from a closed position shown in FIG. 5A, in which the upstream side 162 of the valve head 158 contacts the valve seat 140 to block flow therethrough, to an open position shown in FIG. 5B, in which the valve head 158 moves away from the valve seat 140 to enable flow through the pressure control valve 110.

The biasing member 118 of the illustrated embodiment is a coil spring 118 positioned within the spring chamber 154 of the valve housing 132. An adjustable stop member 170 including a stop surface 172 is threadably engaged with the valve housing 132 to close the spring chamber 154 adjacent the proximal end 144 of the valve housing 132. Thus, the spring 118 extends between and engages the stop surface 172 of the stop member 170 and the spring flange 156 of the valve element 142. The spring 118 biases the valve element 142 toward engagement with the valve seat 140. The amount of biasing force applied to the valve element 142 by the spring 118 may be modified by adjusting the position of the stop member 170 within the valve housing 132. It will be appreciated that the biasing member 118 may include other types of springs or other types of biasing members (such as pneumatically actuated biasing members) in other embodiments without departing from the scope of the invention.

In operation, as pressurized adhesive from the adhesive supply 113 is pumped through the conduit 114 by the adhesive pump 115, at least a portion of the adhesive is bled from the conduit 114 downstream of the pump 115 and upstream of the liquid outlet 126 communicating with the dispensing module 116. This bleed flow of adhesive enters the liquid inlet 134 such that the adhesive forces the valve element 142 away from the valve seat 140 against the bias of the coil spring 118 to enable flow of the adhesive through the liquid recirculation passage 138 and the liquid outlet 136 back to the adhesive pump 115 for further recirculation in the conduit 114. As a result, the pressure control valve 110 regulates the pressure of adhesive delivered to the dispensing module 116 by varying the amount of bleed flow through the pressure control valve 110 as a function of the pressure in the conduit 114. In one example, a small amount of bleed flow may travel through the pressure control valve 110 when the dispensing module 116 is dispensing adhesive material. When the dispensing module 116 stops dispensing adhesive material, the pressure in the conduit 114 rises and the pressure control valve 110 opens further to enable substantially all of the flow from the conduit 114 to be recirculated to the adhesive pump 115. Consequently, the pressure of adhesive supplied to the dispensing module 116 remains at a desired value throughout operation.

Pressurized adhesive in the liquid recirculation passage 138 will undesirably migrate, or leak, out of the liquid recirculation passage 138 and into the spring chamber 154 unless a seal is provided. Thus, the illustrative embodiment of the pressure control valve 110 also includes the flexible seal 120 shown in FIGS. 5A and 5B. The flexible seal 120 of this embodiment is a single convolution elastomeric bellows seal including a first end 174 coupled to the valve element 142, a second end 176 coupled to the valve housing 132, and an intermediate portion 178 extending between the first and second ends 174, 176 thereof. In this regard, the first end 174 is fixedly coupled to the downstream side 164 of the valve head 158 so that the first end 174 of the flexible seal 120 moves with the valve element 142. The second end 176 is fixedly coupled to the guide insert 150 of the valve housing 132 so that the second end 176 does not move with respect to the valve housing 132. The intermediate portion 178 is configured to flex and/or deform as the valve element 142 and therefore the first end 174 move with respect to the guide insert 150 and the second end 176.

The intermediate portion 178 is generally thicker in cross-section than the first and second ends 174, 176 such that the flexible seal is generally arch-shaped. To this end, the intermediate portion 178 of the flexible seal 120 generally flares radially outward from the shaft 160 of the valve element 142. Accordingly, an annular interior cavity 180 is formed between the intermediate portion 178 of the flexible seal 120 and the shaft 160 of the valve element 142. The annular interior cavity 180 partially expands and contracts during movement of the valve element 142 and the first end 174 of the flexible seal 120, which enables the intermediate portion 178 to flex or deform without frictionally moving against the valve element 142 or the guide insert 150. The intermediate portion 178 may also be described as bulbous, or the flexible seal 120 may be described as having only one convolution at the intermediate portion 178.

As noted above, the flexible seal 120 is mounted within the pressure control valve 110 such that the first end 174 is engaged and retained by the valve head 158 and the second end 176 is engaged and retained by the guide insert 150. In this regard, the downstream side 164 of the valve head 158 includes an annular groove 182 that terminates in a first transverse surface 184 configured to abut the first end 174 of the flexible seal 120. The annular groove 182 converges in width towards the first transverse surface 186 to reliably wedge the first end 174 of the flexible seal 120 into a fixed coupling with the valve element 142. Similarly, the guide insert 150 includes an annular recess 186 that terminates in a second transverse surface 188 configured to abut the second end 176 of the flexible seal 120. The annular recess 186 also converges in width towards the second transverse surface 188 to reliably wedge the second end 176 of the flexible seal 120 into a fixed coupling with the guide insert 150 and the valve housing 132. Thus, the flexible seal 120 is captured between the first and second transverse surfaces 184, 188 as shown in FIGS. 5A and 5B.

The flexible seal 120 also includes a seal bore 190 extending from the first end 174 to the second end 176. The seal bore 190 is sized to receive the shaft 160 of the valve element 142 as shown in FIGS. 5A and 5B. The guide insert 150 further includes a housing extension 192 located between the annular recess 186 and the through bore 152. To this end, the seal bore 190 at the first end 174 of the flexible seal 120 fixedly engages the shaft 160 of the valve element 142 between the annular interior cavity 180 and the annular groove 182, and the seal bore 190 at the second end 176 of the flexible seal 120 fixedly engages the housing extension 192 between the annular interior cavity 180 and the annular recess 186.

These engagements of the first and second ends 174, 176 of the flexible seal 120 place the flexible seal 120 into lengthwise compression between the valve head 158 and the guide insert 150. The lengthwise compression preferably exists even in the closed position of the valve element 152 shown in FIG. 5A such that the flexible seal 120 is retained in position on the valve element 142. Consequently, regardless of the position of the valve element 152, the flexible seal 120 prevents the pressurized adhesive from entering the spring chamber 154 through the through bore 152 of the guide insert 150. It will be understood that the guide insert 150 may also include an outer O-ring seal 194 for preventing pressurized adhesive from leaking between the valve housing 132 and the guide insert 150 into the spring chamber 154.

The pressure of the reactive adhesive in the liquid recirculation passage 138 applies force upon the flexible seal 120, but the arch-shape of the flexible seal 120 transmits a majority of this liquid pressure force onto the first and second ends 174, 176 to further ensure sealing engagement of the seal ends 174, 176 with the annular recess 186 and the annular groove 182. In some embodiments, the pressure control valve 110 may only include one of the annular groove 182 or the annular recess 186 for engagement with the flexible seal 120. In these alternative embodiments within the scope of the invention, other techniques such as chemical bonding or adhesives can be used to provide sealing engagement of the first and/or second ends 174, 176 with the valve element 142 and the valve housing 132, respectively.

The flexible seal 120 of this embodiment may be formed from any variety of available elastomeric materials or rubbers, such as, for example, the fluoroelastomer marketed as Viton®. When the elastomeric material forming the seal is Viton®, the elastomeric material may have a hardness or durometer in the range of 40-90. In the exemplary embodiment illustrated, the elastomeric material has a durometer of about 65. This durometer is high enough to provide resistance to hydraulic pressure in the liquid recirculation passage 138 and therefore prevent the intermediate portion 178 of the flexible seal 120 from collapsing onto the shaft 160, which would undermine the benefits of replacing a dynamic seal with the flexible seal. The durometer is also low enough to prevent significant damping of movements of the valve element 142 during operation. Thus, a durometer in the range of 40-90 for the flexible seal 120 allows the flexible seal 120 to resist a wide range of hydraulic pressures in the liquid recirculation passage 138 while also not adversely impacting the movements of the valve element 142 or the flow of reactive adhesive as shown by arrows 196 in the open position of FIG. 5B.

Advantageously, the fixed coupling of the flexible seal 120 to the valve element 142 and to the guide insert 150 eliminates any frictional sliding of the flexible seal 120 that would tend to quickly wear out the seal when reactive adhesive flows through the liquid recirculation passage 138. Moreover, the spring 118 remains isolated from the reactive adhesive and thus does not collect cured bits of adhesive that adversely affect the operation of the spring 118. As a result, the pressure control valve 110 of the exemplary embodiment reduces or eliminates the frequency of downtime necessary for replacement of the seal 120 or cleaning of the spring 118 and the valve housing 132. To this end, the flexible seal 120 improves upon corresponding seals in conventional pressure control valves.

Figure 6A:
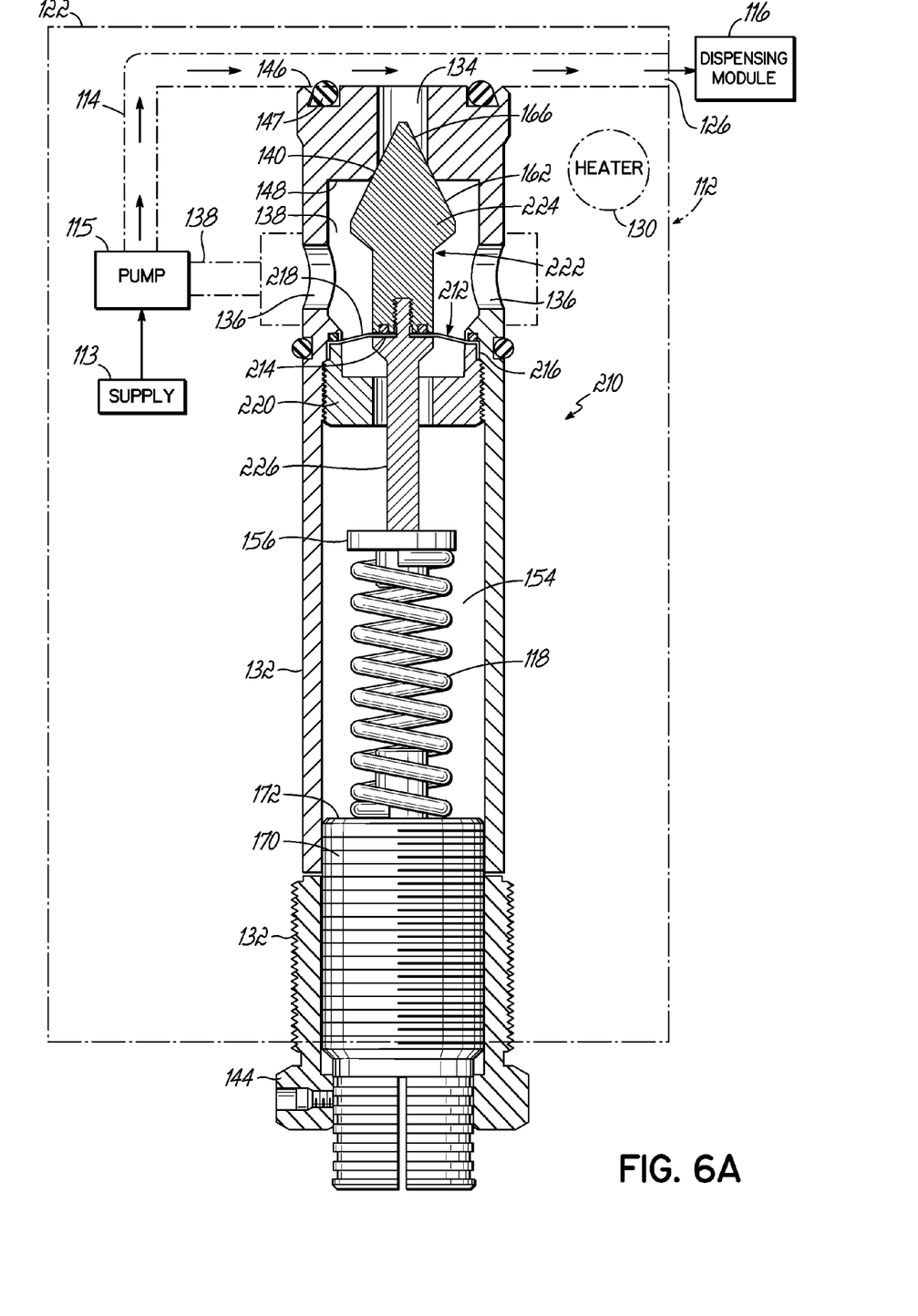
FIG. 6A is a side cross sectional view of an adhesive supply component including a pressure control valve according to another embodiment of the invention, with a valve element in a closed position.
Figure 6B:
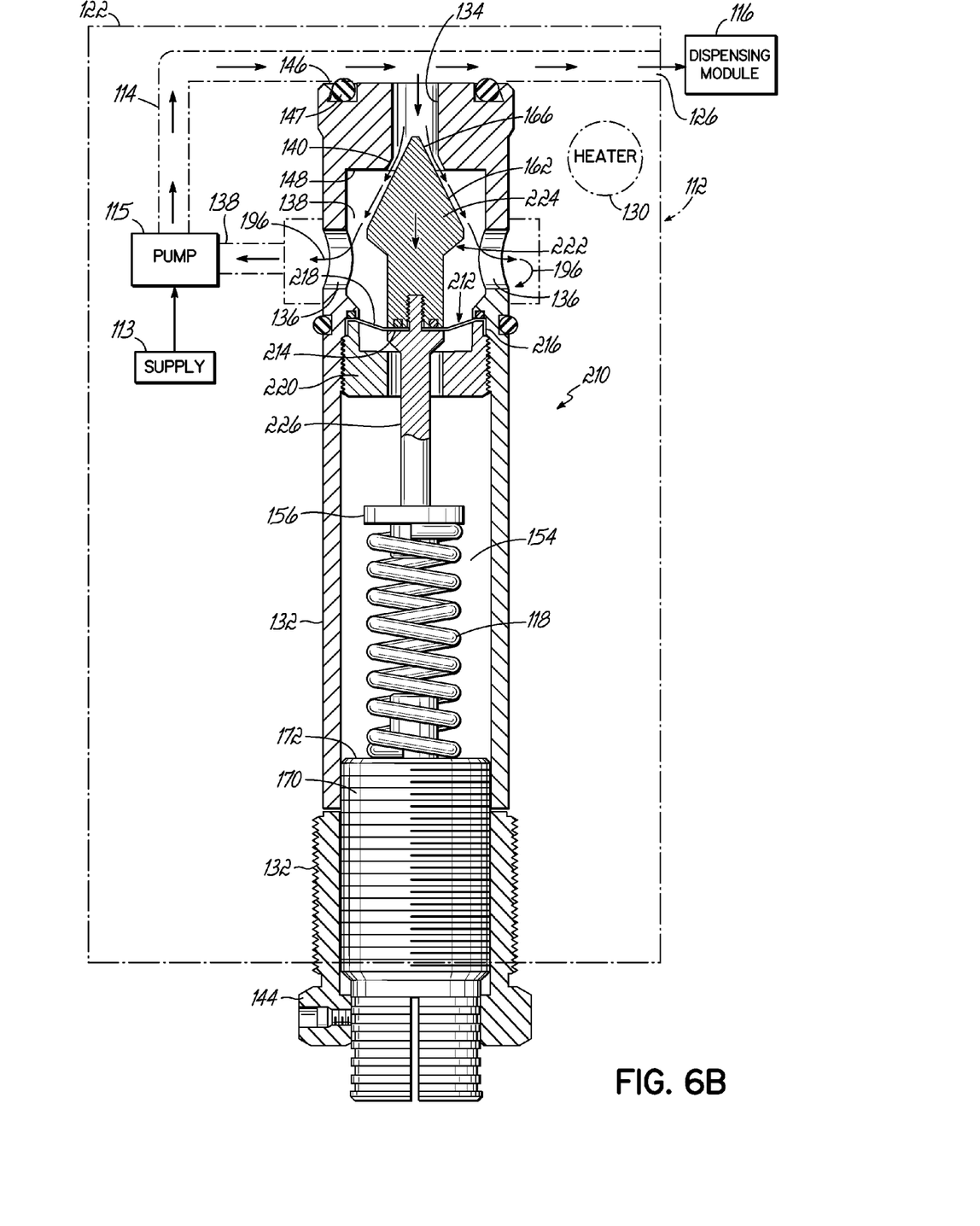
FIG. 6B is a side cross sectional view of the pressure control valve of FIG. 6A, with the valve element in an open position.

With reference to FIGS. 6A and 6B, another embodiment of a pressure control valve 210 is illustrated. This embodiment of the pressure control valve 210 includes many of the same or similar elements described in reference to the first embodiment of the pressure control valve 110, and these elements have been marked with the same reference numbers as used above without further description herein. The primary difference in this embodiment of the pressure control valve 210 is that the flexible seal 212 is a thin ring-shaped membrane 212 rather than a single convolution elastomeric bellows seal. The ring-shaped membrane 212 may be formed from an elastomeric sheet or any other suitable material such as plastics for sealing the spring chamber 154. Similar to the previous flexible seal, the flexible seal 212 of this embodiment may be formed from any variety of available elastomeric materials or rubbers, such as, for example, the fluoroelastomer marketed as Viton®. When the elastomeric material forming the seal is Viton®, the elastomeric material may have a hardness or durometer in the range of 40-90. In the exemplary embodiment illustrated, the elastomeric material has a durometer of about 65.

The flexible seal 212 includes an inner periphery 214 defining the first end 214 of the seal 212, an outer periphery 216 defining the second end 216 of the seal 212, and an intermediate portion 218 extending between the inner and outer peripheries 214, 216. The guide insert 220 of this embodiment is modified to fixedly clamp the outer periphery 216 of the flexible seal 212 between the guide insert 220 and the valve housing 132. The valve element 222 of this embodiment is also modified to fixedly clamp the inner periphery 214 of the flexible seal 212 between the valve head 224 and the shaft 226.

Accordingly, the flexible seal 212 of this pressure control valve 210 also does not move with respect to the valve element 222 or the valve housing 132. As shown in FIGS. 6A and 6B, the intermediate portion 218 of the flexible seal 212 flexes or deforms when the valve element 222 moves with respect to the valve housing 132, thereby maintaining fluid isolation of the liquid adhesive in the liquid recirculation passage 138 from the spring 118 in the spring chamber 154. Thus, the pressure control valve 210 advantageously achieves the same benefits of reduced downtime as described in detail above with reference to the first embodiment of the pressure control valve 210. It will be understood that the specific size and shape of the flexible seal 212 and the valve element 222 may be modified in other embodiments without departing from the scope of the current invention.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. For example, the flexible seal of the pressure control valves 110, 210 may define different shapes and types of sealing members in other embodiments within the scope of the invention. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. A pressure control valve configured to control the pressure of a pressurized adhesive flowing in a conduit from an adhesive pump to a dispensing apparatus, the pressure control valve comprising:
    a valve housing including a liquid inlet configured to communicate with the conduit, a liquid outlet configured to communicate with the adhesive pump, and a liquid recirculation passage extending between said liquid inlet and said liquid outlet;
    a valve seat formed in said liquid recirculation passage;
    a valve element mounted within said valve housing and configured to move with respect to said valve seat to control flow of pressurized adhesive through said valve seat, said valve element including a valve head selectively engaging said valve seat and defining a pressure surface configured to force said valve element away from said valve seat when pressurized adhesive flows toward said valve element such that the adhesive flowing through said valve seat and said liquid recirculation passage is recirculated to the adhesive pump from the conduit, said valve element also including a valve stem separately formed from and coupled to said valve head;
    a biasing member coupled to said valve element at an opposite end of said valve stem from said valve head and configured to bias said valve element towards engagement with said valve seat; and
    a flexible seal including a first end fixedly coupled to said valve element, a second end fixedly coupled to said valve housing, and an intermediate portion between said first and second ends, wherein said intermediate portion of said flexible seal is configured to flex or deform when the valve element is forced away from the valve seat when the pressurized adhesive flows toward the valve element as said first end of said flexible seal follows movements of said valve element such that said flexible seal prevents the pressurized adhesive from contacting said biasing member,
    wherein said flexible seal includes a ring-shaped membrane including an inner periphery defining said first end, an outer periphery defining said second end, and said intermediate portion extending between said inner and outer peripheries and configured to flex as said flexible seal follows movements of said valve element, said inner periphery fixedly clamped between said valve head and said valve stem, and
    wherein said ring-shaped membrane is defined by an elastomeric sheet of material that is configured to elastically deform in said intermediate portion, and wherein said intermediate portion of said elastomeric sheet is not engaged with any additional elements clamped between said valve head and said valve stem so that said intermediate portion is capable of flexing as the valve element moves and without damping valve element or membrane movement.

2. The pressure control valve of claim 1, wherein said valve housing includes a spring chamber fluidically isolated from said liquid recirculation passage by said flexible seal, and said biasing member includes a spring located within said spring chamber and extending between said valve element and a stop surface within said spring chamber.

3. The pressure control valve of claim 2, further comprising:
    an adjustable stop member including said stop surface and moveably disposed within said spring chamber such that the bias applied by said spring to said valve element is adjustable by moving said adjustable stop member.

4. An adhesive supply component for supplying a pressurized adhesive to a dispensing apparatus, the adhesive supply component comprising:
    an adhesive pump;
    a supply component housing including a conduit extending between said adhesive pump and a liquid outlet leading to the dispensing apparatus, said supply component housing also including a liquid recirculation passage extending between said conduit and said adhesive pump; and
    a pressure control valve coupled to said supply component housing and further comprising:
        a valve housing defining at least a portion of said liquid recirculation passage;
        a valve seat formed in said valve housing;
        a valve element mounted within said valve housing and configured to move with respect to said valve seat to control flow of pressurized adhesive through said valve seat, said valve element including a valve head selectively engaging said valve seat and defining a pressure surface configured to force said valve element away from said valve seat when pressurized adhesive flows toward said valve element such that the adhesive flowing through said valve seat and said liquid recirculation passage is recirculated to the adhesive pump from the conduit, said valve element also including a valve stem separately formed from and coupled to said valve head;
        a biasing member coupled to said valve element at an opposite end of said valve stem from said valve head and configured to bias said valve element towards engagement with said valve seat; and
        a flexible seal including a first end fixedly coupled to said valve element, a second end fixedly coupled to said valve housing, and an intermediate portion between said first and second ends, wherein said intermediate portion of said flexible seal is configured to flex or deform when the valve element is forced away from the valve seat when the pressurized adhesive flows toward the valve element as said first end of said flexible seal follows movements of said valve element such that said flexible seal prevents the pressurized adhesive from contacting said biasing member, wherein said flexible seal includes a ring-shaped membrane including an inner periphery defining said first end, an outer periphery defining said second end, and said intermediate portion extending between said inner and outer peripheries and configured to flex as said flexible seal follows movements of said valve element, said inner periphery fixedly clamped between said valve head and said valve stem, and wherein said ring-shaped membrane is defined by an elastomeric sheet of material that is configured to elastically deform in said intermediate portion, and wherein said intermediate portion of said elastomeric sheet is not engaged with any additional elements clamped between said valve head and said valve stem so that said intermediate portion is capable of flexing as the valve element moves and without damping valve element or membrane movement.

5. The adhesive supply component of claim 4, wherein said valve housing includes a spring chamber fluidically isolated from said liquid recirculation passage by said flexible seal, and said biasing member includes a spring located within said spring chamber and extending between said valve element and a stop surface within said spring chamber.

6. The adhesive supply component of claim 5, further comprising:
an adjustable stop member including said stop surface and moveably disposed within said spring chamber such that the bias applied by said spring to said valve element is adjustable by moving said adjustable stop member.

7. The adhesive supply component of claim 4, further comprising:
a heater within said supply component housing for heating the pressurized adhesive.

* * * * *